(12) United States Patent
Dymek-Krakowiak et al.

(10) Patent No.: US 12,564,189 B2
(45) Date of Patent: *Mar. 3, 2026

---

(54) METHOD FOR TREATING CUT FLOWERS

(71) Applicant: OPTICEPT TECHNOLOGIES AB, Lund (SE)

(72) Inventors: Katarzyna Maria Dymek-Krakowiak, Lund (SE); Stephen Kwao, Lund (SE)

(73) Assignee: OPTICEPT TECHNOLOGIES AB, Lund (SE)

( * ) Notice: Subject to any disclaimer, the term of this patent is extended or adjusted under 35 U.S.C. 154(b) by 649 days.

This patent is subject to a terminal disclaimer.

(21) Appl. No.: 17/628,729

(22) PCT Filed: Jul. 21, 2020

(86) PCT No.: PCT/SE2020/050742
§ 371 (c)(1),
(2) Date: Jan. 20, 2022

(87) PCT Pub. No.: WO2021/015660
PCT Pub. Date: Jan. 28, 2021

(65) Prior Publication Data
US 2022/0256841 A1 Aug. 18, 2022

(30) Foreign Application Priority Data
Jul. 23, 2019 (SE) .................................... 1950903-3

(51) Int. Cl.
*A01N 3/02* (2006.01)
*A01G 5/06* (2006.01)

(52) U.S. Cl.
CPC ................ *A01N 3/02* (2013.01); *A01G 5/06* (2013.01)

(58) Field of Classification Search
None
See application file for complete search history.

(56) References Cited

U.S. PATENT DOCUMENTS 4,103,457 A 8/1978 Carlisle

FOREIGN PATENT DOCUMENTS

| | | |
|---|---|---|
| CN | 105767428 A | 7/2016 |
| CN | 106614539 A | 5/2017 |
| EP | 0 266 141 A2 | 5/1988 |
| EP | 1 075 790 B1 | 2/2004 |
| JP | 2008239506 A | 10/2008 |
| SE | 540464 C2 | 4/2018 |
| WO | 8907392 A1 | 8/1989 |
| WO | WO1989007392 A1 * | 8/1989 |
| WO | 2008055614 A2 | 5/2008 |
| WO | 2009045144 A1 | 4/2009 |
| WO | 2016153413 A1 | 9/2016 |
| WO | 2018125933 A1 | 7/2018 |
| WO | 2020122798 A1 | 6/2020 |

OTHER PUBLICATIONS

Hellstrom, M., The use of cryoprotectants in unrooted cuttings of Pelargonium zonale, in order to increase their life expectancy, http://stud.epsilon.slu.se. 2017, pp. 1-37 (Year: 2017).*
Kofranek, A.M. et al., The value of impregnating cut stems with high concentrations of silver nitrate, 1975, Acta Horticulturae, vol. 41, 199-206 (Year: 1975).*
Van Doorn, W.G. et al., Alkylethoxylate surfactants for rehydration of roses and Bouvardia flowers, Postharvest Biology and Technology, 2002, vol. 24, 327-333 (Year: 2002).*
International Search Report for Application No. PCT/SE2020/050742 dated Sep. 23, 2020 (4 pages).
Maria Hellström, "The use of cryoprotectants in unrooted cuttings of Pelargonium zonale, in order to increase their life expectancy", http://stud.epsilon.slu.se, 2017, pp. 1-37.
Phoon et al., "Pulsed electric field in combination with vacuum impregnation with trehalose improves the freezing tolerance of spinach leaves", Journal of Food Engineering. Sep. 1, 2008, pp. 1-5.
Zhao et al., "Practical applications of vacuum impregnation in fruit and vegetable processing", Trends in food science & technology. Sep. 1, 2004, pp. 1-18.
Ahmad Husain, "Study of the Effect of Vacuum Impregnation With Different Substances on Respiration and Color of Packed Spinach", Department of Food Technology, Engineering and Nutrition, 2017, pp. 1-45.
Supplementary European Search Report for corresponding Application No. EP 20 84 4192 dated Jul. 10, 2023 (7 pages).

* cited by examiner

*Primary Examiner* — Bethany P Barham
*Assistant Examiner* — Paul Hoerner
(74) *Attorney, Agent, or Firm* — Tutunjian & Bitetto, P.C.

(57) ABSTRACT

The present invention describes a method for treating one or more cut flowers each including a stem, possibly leaves and a flower bud, said method comprising—arranging one or more cut flowers in an impregnation solution so that at least a portion of the stem of said one or more cut flowers are immersed in the impregnation solution, but where the flower bud is free from impregnation solution; and—applying vacuum impregnation or pressure impregnation, preferably vacuum 10 impregnation, to the impregnation solution when said at least portion of the stem are immersed into the impregnation solution.

22 Claims, 2 Drawing Sheets

Fig. 1. Roses stored at room temperature for 13 days after the treatment (Right: roses treated according to the present invention, left: control roses, i.e. not treated).
 
Fig. 2. Roses stored at room temperature for 14 days after the treatment (Right: roses treated according to the present invention, left: control roses, i.e. not treated).

Treated with bud in the
impregnation solution
Treated without bud in the
impregnation solution
Fig. 3. Comparison of treated roses according to the present invention (right, i.e. treated without bud in the impregnation solution) with treated roses with bud in the impregnation solution.

METHOD FOR TREATING CUT FLOWERS

FIELD OF THE INVENTION

The present invention relates to a method for treating cut flowers.

SUMMARY OF THE INVENTION

The present invention relates to a method for treating one or more cut flowers each comprising a stem, possibly leaves and a flower bud, said method comprising arranging one or more cut flowers in an impregnation solution so that at least a portion of the stem of said one or more cut flowers are immersed in the impregnation solution, but where the flower bud is free from impregnation solution; and applying vacuum impregnation or pressure impregnation, preferably vacuum impregnation, to the impregnation solution when said at least portion of the stem are immersed into the impregnation solution.

As should be understood from above, the present invention provides a method in which it is ensured that the flower bud is free from impregnation solution. This is an important and unique aspect of the present invention.

In the article "The use of cryoprotectants in unrooted cuttings of *Pelargonium zonale*, in order to increase their life expectancy", Swedish University of Agricultural Sciences. Faculty of Landscape Architecture, Horticulture and Crop Production Science, Department of Biosystems and Technology, 2017, there is disclosed a method involving treating cuttings by use of vacuum impregnation. It should be noted that this article suggests treating the entire object, in this case cuttings, i.e., not cut flowers. The present invention, however, provides a method in which a flower bud of a cut flower is free from impregnation solution. This is very important because the flower buds are susceptible to the fungus disease *botrytis*, which will cause flowers to turn black and decay. *Botrytis* has ranges of temperature and relative humidity that are necessary for spore germination, infection and disease development. Spore germination and infection depends on a film of moisture for 8 to 12 hours, relative humidity of 93% or greater, and temperatures between 13-18° C. with colonization of plant tissues occurring at temperatures up to 21° C.

In relation to the above it may also be mentioned that in the results below and in FIG. 3 there is shown the importance of treating the cut flower according to the present invention, i.e., where only the stem or part of the stem (and leaves) are immersed in the impregnation solution and where the flower bud is kept out of/free from the impregnation solution.

BRIEF DESCRIPTION OF THE DRAWINGS

FIG. 1 is an exemplary illustration of roses stored at room temperature for 13 days after treatment according to an embodiment of the present invention vs. untreated roses;

FIG. 2 is an exemplary illustration of roses stored at room temperature for 14 days after treatment according to an embodiment of the present invention vs. untreated roses; and FIG. 3 is an exemplary illustration of a comparison of treated roses treated without bud in an impregnation solution according to an aspect of the present invention vs. treated roses with bud in the impregnation solution.

DETAILED DESCRIPTION

Some specific embodiments of the present invention are provided below.

According to one specific embodiment of the present invention, the impregnation solution comprises at least one sugar. According to yet another embodiment, said at least on sugar is glucose, trehalose and/or fructose in a concentration of at least 2 wt %, in this regard it may also be mentioned that the impregnation solution according to the present invention preferably is an aqueous impregnation solution.

The impregnation solution may also comprise additives. In relation to the impregnation solution it should be noted that this may comprise at least one sugar without any additives, at least one sugar and additives, or only additives.

According to one embodiment, the impregnation solution comprises at least one additive being a vitamin, mineral, nutrient, such as silica, antimicrobial, or a combination thereof. According to yet another embodiment, the impregnation solution comprises at least one additive of folic acid, gamma-aminobutyric acid (GABA), ethylene blocker (controller), e.g., 1-methylcyclopropene (1-MCP), amino acid, e.g. cysteine, plant hormone. e.g. IBA, an antiseptic agent, e.g. silver nitrate, a surfactant, or a combination thereof.

As may be understood from above, different additive types are possible according to the present invention. According to one embodiment of the present invention, at least one surfactant is included in the impregnation solution. This may be of interest to improve the weight gain, especially when treating at high pressures and less treatment time.

Method process parameters are also of interest according to the present invention. According to one embodiment, the method involves vacuum impregnation in a minimum pressure range of 50-500 mbar, preferably in the range of 60-300 mbar. According to yet another embodiment, the method is performed during a total treatment time of at least 3 minutes. e.g. at least 5 minutes or 10 minutes. Furthermore, according to yet another specific embodiment, the method involves vacuum impregnation in at least three phases, said at least three phases being a falling step when the pressure is decreased to a certain low pressure, then a holding step in which the low pressure is kept or substantially kept at the low pressure, and a pressure rising step where the pressure is increased to atmospheric level. According to one further embodiment, the falling step is performed in a range of 1-20 minutes, preferably the falling step is performed in a range of 5-15 minutes, preferably wherein the holding step is performed in a range of 15 seconds-5 minutes, preferably wherein the holding step is performed in a range of 30 seconds-3 minutes. Moreover, according to yet another embodiment, the rising step is performed in a range of 1-30 minutes, preferably in a range of 1-10 minutes.

The method according to the present invention may involve other steps. In some cases, it is of interest to include a REF (pulsed electrical field) treatment. It should, however, be noted that only the vacuum impregnation is mandatory. Therefore, according to one embodiment, said method is performed without performing a prior, simultaneous or subsequent PEF (pulsed electrical field) treatment. Such a PEF step may, however, be part of the method according to the present invention. Therefore, according to yet another embodiment, the method also involves a step of applying PEF (pulsed electric field).

Other steps may also be part of the method according to the present invention. According to one specific embodiment, the method involves a subsequent washing step comprising immersing said one or more cut flowers into water to wash sugars from the surface of the cut flower, and wherein the immersing is performed so that the flower bud is excluded from being immersed. Moreover, according to another embodiment, the cut flowers are directly subjected to a cooling step after the washing step, said cooling step being a recovering step. The cooling step may suitably be performed at a temperature of 2-10° C., such as suitably in a range of 5-10° C. Moreover, according to one embodiment, the cooling step is performed during at least 6 hours, preferably at least 12 hours, such as in the range of 12-24 hours. Furthermore, the cooling should be performed in a controlled storing environment. According to one embodiment, the storing environment involves a humidity of above 50%. Moreover, the cooling and transportation may be performed in a modified atmosphere. Furthermore, the cooling may suitably be performed in an aerated room so that the surfaces of the leaves dry on themselves.

In relation to the above it should be mentioned that the cooling step may also be seen as a recovery step in a cooled or low temperature.

Moreover, according to yet another embodiment, freezing is applied instead of cooling. Cooling is, however, preferred.

Moreover, according to yet another embodiment, the impregnation is a partial impregnation, preferably wherein the impregnation is a partial impregnation where the weight gain is 50% of the full impregnation weight gain.

Prevention of microbial contamination is important. According to one embodiment of the present invention, the method also comprises an active step for preventing microbial contamination of the (aqueous) impregnation solution. According to one specific embodiment, the active step for preventing microbial contamination involves adding one or more antimicrobial agents to the impregnation solution, preferably wherein the active step for preventing microbial contamination involves an active treatment of the impregnation solution. Moreover, according to yet another embodiment, the impregnation solution is recirculated and reused, preferably as an active step for preventing microbial contamination.

The present invention is also directed to a system for treating one or more cut flowers. Therefore according to the present invention there is also disclosed a system for treating one or more cut flowers each comprising a stem, possibly leaves and a flower bud, said system comprising a treatment unit arranged for performing the method according to the present invention, wherein the treatment unit is arranged to allow for stable standing positions of cut flowers and has means for adjusting the level of an impregnation solution so that flower buds of the cut flowers are not immersed in the impregnation solution. According to one specific embodiment, the treatment unit is arranged for performing also a washing step. This may be of interest to wash off the sugar(s).

Moreover, the present invention also refers to a cut flower treated by the method according to the present invention.

Performed Trials

Roses (variety: Athena) were purchased form a local distributor. The roses were transported from Kenya. The roses arrived at the test site 4 days after harvest.

The treatment according to the present invention was applied to the roses immediately after the arrival. The roses were placed vertically in an impregnation solution, making sure that the flower bud was not immersed in the impregnation solution, thus only the stem and leaves were immersed. The impregnation solution contained sugar (fructose at a concentration of 2-15 wt %). Vacuum was applied reaching a minimum pressure range of 60-300 mbar, and with a total treatment time of about 12 minutes.

After that the vacuum impregnation treatment was finished, the roses were taken out from the impregnation solution. They were then immersed in water, again excluding the flower buds, to wash the sugars from the surface and then placed in a cold room for 24 hours to recover. They were in this case not dried in any way.

After 24 hours the roses were moved to room temperature in order to evaluate the results at the end user conditions. They were stored in a vase, with only the lower part of the stems immersed in water, and the water was renewed every two days.

Results show a clear improvement of the general appearance of roses that were impregnated with sugar prior to storage (see FIG. 1). The browning and wilting of the flower buds are delayed for the treated roses compared to the control. Also, the treated leaves preserve freshness better.

In FIG. 1 there is shown roses stored at room temperature for 13 days after the treatment (Right: roses treated according to the present invention, left: control roses, i.e. not treated).

In FIG. 2 there is shown roses from yet another trial. In this case the roses were stored at room temperature for 14 days after the treatment (Right: roses treated according to the present invention, left: control roses, i.e. not treated).

In another trial, relating to FIG. 3, the following was performed and with the parameters stated below.

Samples for treatment were divided into two parts of 15 roses each

For one sample, the whole plant, including the bud were dipped in impregnation solution For the other part, only the stem and leaves were dipped in the impregnation solution Vacuum impregnation was applied (minimum pressure 60 mbar, pressure falling time 5 minutes, vacuum holding time 1 minute and pressure rising time 1 minute)

Storage

Stems were dipped in 1 L beakers containing 800 ml water after treatment

The roses were stored 24 h in cold (8° C.) for 24 hours and then moved to room temp (25° C.) for vase life studies Result Flower buds of samples treated with the flower bud in the impregnation solution were completely rotten after 4 days at room temperature. As may be seen, for samples treated without the flower bud in impregnation solution. i.e., by the method according to the present invention, the flower buds are healthy and vigour after 4 days at room temperature.

The results of the different trials after 4 days at room temperature are shown in FIG. 3. Again, and as may be seen, the flowers treated according to the present invention, i.e. with vacuum impregnation and where the flower buds are not in the impregnation solution exhibit the best features and appearance. Moreover, it may be seen that impregnating the flower buds with the impregnation solution leads to shorted vase life.

Systems According to the Present Invention

A system according to the present invention may be of different types.

According to one specific embodiment, the system for treating one or more cut flowers comprises a treatment unit arranged to allow for stable standing positions of cut flowers and has means for adjusting the level of an impregnation solution so that flower buds of the cut flowers are not immersed in the impregnation solution.

Possible important features of a system according to the present invention, and the use thereof, are the following:

Provides for an adjustable level of the impregnation solution so that the flower heads/flower buds are not immersed;

Allows for treatment of only the stem and leaves. One possible example according to the present invention is to ensure for stable, standing position of cut flowers;

The pressure used is specific to allow the impregnation but not to destroy any part of the cut flower;

All the steps performed need to be taken in a controlled way (solution entering slowly to avoid any splashing of solution on the flower buds);

Allows for well controlled pressure changes;

Washing can be performed in the same treatment unit (chamber), also avoiding the flower to be immersed.

Another optional feature according to the present invention is to allow for pulsed electric field (PEF) treatment, suitably in the same treatment unit (chamber).

The invention claimed is:

1. A method for treating one or more cut flowers comprising the steps of:

providing said one or more cut flowers, each comprising at least a stem and a flower bud;

arranging and partially immersing each of said one or more cut flowers in an impregnation solution so that at least a portion of the stem of said one or more cut flowers are immersed in the impregnation solution, wherein the step of partially immersing comprises excluding the flower bud from being immersed in the impregnation solution; and applying vacuum impregnation to the impregnation solution during said step of partially immersing when said at least portion of the stem are immersed into the impregnation solution, said vacuum impregnation being applied in at least three phases which are a falling step when the pressure is decreased to a certain minimum pressure, then a holding step in which the minimum pressure is kept or substantially kept, and a pressure rising step where the pressure is increased to atmospheric level; and wherein the impregnation solution comprises at least a surfactant, and wherein the method involves vacuum impregnation in a minimum pressure range of 50-500 mbar.

2. The method according to claim 1, wherein the impregnation solution comprises at least one sugar.

3. The method according to claim 2, wherein said at least one sugar is glucose, trehalose and/or fructose in a concentration of at least 2 wt %.

4. The method according to claim 1, wherein the impregnation solution comprises at least one additive being a vitamin, mineral, nutrient, antimicrobial, or a combination thereof.

5. The method according to claim 1, wherein the impregnation solution comprises at least one additive of folic acid, gamma-aminobutyric acid (GABA), ethylene blocker, 1-methylcyclopropene (1-MCP), amino acid, plant hormone, IBA, an antiseptic agent, or a combination thereof.

6. The method according to claim 1, wherein the method involves vacuum impregnation in a minimum pressure range of 60-300 mbar.

7. The method according to claim 6, wherein the method is performed during a total treatment time of at least 3 minutes.

8. The method according to claim 1, wherein the falling step is performed in a range of 1-20 minutes, and wherein the holding step is performed in a range of 15 seconds-5 minutes.

9. The method according to claim 1, wherein the rising step is performed in a range of 1-30 minutes.

10. The method according to claim 1, wherein said method is performed without performing a prior, simultaneous or subsequent PEF (pulsed electrical field) treatment.

11. The method according to claim 1, wherein the method also involves a step of applying PEF (pulsed electric field).

12. The method according to claim 1, wherein the method involves a subsequent washing step comprising immersing said one or more cut flowers into water to wash sugars from the surface of the cut flower, and wherein the immersing is performed so that the flower bud is excluded from being immersed.

13. The method according to claim 12, wherein the cut flowers are directly subjected to a cooling step after the washing step, said cooling step being a recovering step.

14. The method according to claim 13, wherein the cooling step is performed at a temperature of 2-10° C.

15. The method according to claim 13, wherein the cooling step is performed during at least 6 hours.

16. The method according to claim 1, wherein the impregnation is a partial impregnation.

17. The method according to claim 1, wherein the method involves cooling the biological material in a controlled storing environment.

18. The method according to claim 17, wherein the cooling environment involves a humidity of above 50%.

19. The method according to claim 1, wherein the method also comprises an active step for preventing microbial contamination of the impregnation solution.

20. The method according to claim 19, wherein the active step for preventing microbial contamination involves adding one or more antimicrobial agents to the impregnation solution.

21. The method according to claim 1, wherein the impregnation solution is recirculated and reused.

22. The method according to claim 1, wherein the impregnation solution comprises at least one additive of silver nitrate.

* * * * *